United States Patent
Hsieh

(10) Patent No.: US 7,860,399 B2
(45) Date of Patent: Dec. 28, 2010

(54) HOST-INDEPENDENT LINK VALIDATION BETWEEN OPTICAL COMMUNICATIONS MODULES

(75) Inventor: John Hsieh, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 878 days.

(21) Appl. No.: 11/566,391

(22) Filed: Dec. 4, 2006

(65) Prior Publication Data
US 2007/0177879 A1   Aug. 2, 2007

Related U.S. Application Data

(63) Continuation-in-part of application No. 11/043,386, filed on Jan. 25, 2005.

(51) Int. Cl.
*H04B 10/00* (2006.01)
*H04B 17/00* (2006.01)

(52) U.S. Cl. .................. 398/151; 398/16; 398/162

(58) Field of Classification Search .............. 398/9, 398/16, 151, 156, 162
See application file for complete search history.

(56) References Cited

U.S. PATENT DOCUMENTS

| 6,160,647 | A  |    | 12/2000 | Gilliland et al. |         |
|-----------|----|----|---------|------------------|---------|
| 6,220,873 | B1 |    | 4/2001  | Samela et al.    |         |
| 7,218,852 | B1 | *  | 5/2007  | Sharma           | 398/48  |
| 7,248,797 | B2 | *  | 7/2007  | Forsberg         | 398/15  |
| 7,418,209 | B2 | *  | 8/2008  | Salamon et al.   | 398/185 |
| 7,499,646 | B2 | *  | 3/2009  | Emongkonchai     | 398/2   |
| 7,532,817 | B1 | *  | 5/2009  | Ko               | 398/7   |
| 2003/0039010 | A1 | * | 2/2003 | Akimoto et al.  | 359/152 |
| 2003/0053170 | A1 |   | 3/2003 | Levinson et al. |         |
| 2004/0175077 | A1 |   | 9/2004 | Weber           |         |
| 2005/0084268 | A1 | * | 4/2005 | Weigert         | 398/135 |
| 2006/0093379 | A1 | * | 5/2006 | Aronson         | 398/208 |
| 2009/0245788 | A1 | * | 10/2009 | Varshneya et al. | 398/33 |

OTHER PUBLICATIONS

Infineon Technologies, Optiport SFF BiDi-Transceiver 100 Mbit/s, 1310 nm Tx/1550 nm Rx, Jun. 22, 2004, pp. 1-14.

* cited by examiner

*Primary Examiner*—Nathan M Curs
(74) *Attorney, Agent, or Firm*—Workman Nydegger

(57) ABSTRACT

Systems and methods for validating a data link between two communication modules, such as optical transceiver modules configured for bidirectional optical communication, are disclosed. In one embodiment a method according to the invention includes a first optical transceiver module transmitting a first validation optical signal to a second optical transceiver module via an optical waveguide, such as an optical fiber, that physically interconnects both transceivers. The first validation optical signal is received by the second optical transceiver module, which lights an indicator light on its housing and returns a second validation optical signal to the first optical transceiver module. Upon receipt of the signal, the first transceiver lights its indicator light and enables data transfer to occur between both transceivers. In other embodiments, the validation signals can be encrypted or scrambled to authenticate the transceivers as legitimate devices, or can contain identifying or descriptive information regarding the transceivers.

13 Claims, 10 Drawing Sheets

HOST-INDEPENDENT LINK VALIDATION BETWEEN OPTICAL COMMUNICATIONS MODULES

CROSS-REFERENCE TO RELATED APPLICATIONS

This application is a continuation-in-part of U.S. patent application Ser. No. 11/043,386, filed Jan. 25, 2005, and entitled "Optical Transceivers with Closed-Loop Digital Diagnostics," which is incorporated herein by reference in its entirety.

THE FIELD OF THE INVENTION

The present invention relates generally to the field of optical transceivers. More particularly, embodiments of the invention relate to optical transceivers with closed-loop diagnostics and host-independent link validation between transceivers.

BACKGROUND OF THE INVENTION

High speed data communication networks often use optical transceivers to transmit and receive optical signals carrying digitally encoded data. Optical transceivers typically use an optical transmitter, such as a laser, to transmit optical signals and an optical receiver, such as a photodiode, to receive optical signals. Conventional transceivers require a pair of optical fibers to implement full-duplex functionality. One optical fiber connects with the optical transmitter while the other optical fiber connects with the optical receiver.

Advancements in optical data communication technology have enabled bidirectional data transmission over a single optical fiber. These bidirectional communication systems can allow for data to be transmitted in both directions over a single optical fiber instead of requiring an individual optical fiber for each direction of data transmission. Bidirectional communication technology increases bandwidth by essentially doubling the data payload capacity. While bidirectional communication in optical networks can increase the amount of information that can be transmitted and received, these networks may still be affected by data transmission errors. Such errors can be caused, for example, by improper laser driver power control or modulation.

Diagnostic information is often used to address these types of problems. However, conventional diagnostic functions are open-loop in nature. For example, an optical transmitter can report its own output power and an optical receiver can report its own received optical power. While the optical transmitter or the optical receiver can provide useful diagnostic information, the diagnostic information may not be at the location best suited to utilize the information and implement a correction procedure because of the open-loop nature of the system. For example, an optical receiver that reports low optical power cannot be used by the optical transmitter that transmitted the optical signal. In other words, human intervention is typically needed to fix any problems indicated by the diagnostic information provided by the optical transmitter or the optical receiver. Further, conventional optical transceivers cannot self-compensate to maintain the integrity of the optical data when the data link degrades.

Yet another problematic aspect of optical communication networks relates to the validation or integrity of an optical link that is desirably established between a pair of optical transceiver modules. Unlike its electrical analog, i.e., copper cabling including CAT-5 and LAN connections, wherein a user can visually or otherwise verify the establishment of a link between two ends of the connection, no indicator is available to verify when a reliable optical link between two transceivers has been established.

Thus, when a problem condition exists, such as a faulty transmitting or receiving port, a contaminated optical fiber end face, a broken or kinked optical fiber, an incompatible transceiver pairing at either end of the link, etc., it may prove difficult for a technician to debug the condition, given the relative difficulty in determining at the outset whether a valid link is even established between the transceivers. In such a case, the technician or user must instead rely on the host system on either end of the problem link for information regarding whether a data link has been acceptably established. This in turn makes the technician or user relatively more reliant on the host system(s) and their particular on-board software, which further complicates the debugging process.

It is noted that a receiving port of an optical transceiver module linked to another transceiver can employ loss of signal ("LOS") or signal detect ("SD") functions as part of an industry standard in order to indicate the absence (LOS) or presence (SD) of an optical signal at the receiving port. Unfortunately, however, no analogous indicators are available on the transmitting port of the linked transceiver. This is because receiving ports have been traditionally incapable of transmitting information regarding the presence of a link therebetween.

It is therefore seen that a need exists for an indicator or other identifier to be available on the transmitting end of a data link between an optical transmitter and optical receiver, such as in the case of two linked optical transceiver modules. Specifically, a need exists for an optical receiver that is capable of communicating data regarding the successful establishment of an optical data link between it and a remotely situated optical transmitter. Any solution to these needs should further facilitate a technician or other user to readily debug the link without excessive reliance on the host systems in which the optical transmitter and optical receiver reside.

BRIEF SUMMARY OF THE INVENTION

These and other limitations are overcome by embodiments of the present invention, which relate to systems and methods for closed loop diagnostics in an optical environment. Embodiments of the invention relate to self adjusting optical transceivers with closed loop diagnostics. Advantageously, a self adjusting optical transceiver enables high speed bidirectional communications in an optical network that can perform closed-loop feedback functions.

An exemplary embodiment of the invention provides an optical transceiver module that automatically adjusts to maintain an integrity of a data link. The optical transceiver can include a 'transmit' optical subassembly ("TOSA") and a 'receive' optical subassembly ("ROSA"). Accordingly, the TOSA can include a primary transmitter module, a secondary receiver module, and a first diagnostic module. The primary transmitter module can be configured for transmitting a first data signal through an optical fiber. Also, the secondary receiver module can be configured for receiving a second data signal through the same optical fiber. The first diagnostic module can be communicatively coupled with both the transmitting subassembly and the receiving subassembly. Additionally, the first diagnostic module can be configured to use at least a portion of the second data signal to adjust at least one of a power and a modulation of the first data signal. The second data signal may also be used to adjust the wavelength of the laser when the laser is tunable.

In another embodiment, the ROSA can include a primary receiver module, a secondary transmitter module, and a second diagnostic module. The primary receiver module can be configured for receiving a third data signal through a second optical fiber. Also, the secondary transmitter module can be configured for transmitting a fourth data signal through the second optical fiber. The second diagnostic module can be communicatively coupled with the receiver module and the transmitter module. Additionally, the second diagnostic module can be configured for using at least a portion of the third data signal to generate at least a portion of the fourth data signal, the at least a portion of the fourth data signal containing diagnostic data about the first data signal. One of skill in the art can appreciate that the first and second diagnostic modules can be embodied as a single diagnostic module that is used, when necessary by both the ROSA and/or the TOSA.

In yet another embodiment, systems and methods for validating a data link between two communication modules, such as optical transceiver modules configured for bidirectional optical communication, are disclosed. One implementation of a method according to the invention includes a first optical transceiver module transmitting a first validation optical signal to a second optical transceiver module via an optical waveguide, such as an optical fiber, that physically interconnects both transceivers. The first validation optical signal is received by the second optical transceiver module, which lights an indicator light on its housing and returns a second validation optical signal to the first optical transceiver module. Upon receipt of the signal, the first transceiver lights its indicator light and enables data transfer to occur between both transceivers. In other embodiments, the validation signals can be encrypted or scrambled to authenticate the transceivers as legitimate devices, or can contain identifying or descriptive information regarding the transceivers.

These and other exemplary embodiments of the present invention will become more fully apparent from the following detailed description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

The present invention relates to optical transceivers with closed-loop diagnostic functions. The systems and methods of the present invention enable diagnostic information to form a closed-loop between optical transceivers. The closed-loop enables, for example, an optical transceiver that receives an optical signal to transmit diagnostic information back to the transmitting optical transceiver. Embodiments of the invention enable closed-loop diagnostics without reducing the effective bandwidth of the data link between the optical transceivers. Embodiments of the invention also accommodate network architectures where, for example, multiple transceivers are included in the data link and a particular transceiver is connected with at least two other transceivers.

In yet other embodiments, the present invention enables the status of a data link to be transmitted from an optical receiver to an optical transmitter of the link, thereby providing a "link indicator" to the optical transmitter that enables it to be informed as to the connectivity status of the remotely disposed optical receiver. Moreover, this link indicator capability is enabled independently of the host devices in which the optical transmitter and optical receiver are disposed, thereby simplifying the debugging of any problem conditions when the link is nonfunctional. The optical transmitter and optical receiver are configured in one embodiment as optical transceiver modules, though other types of optical communications modules can also benefit from the principles discussed below.

Reference will now be made to the drawings to describe various aspects of the exemplary embodiments of the invention. The drawings are diagrammatic and schematic representations of exemplary embodiments, and are not limiting of the present invention.

Operating Environment

While the exemplary embodiments of the invention discussed below are usable in conjunction with a high speed optical data transmission system conforming to the small form factor pluggable (SFP) standards or to be compatible with gigabit interface connectors (GBIC), such operating environments are exemplary only and embodiments of the invention can be employed in any of a variety of current and future high speed data transmission systems. Additionally, the invention can be operable with Gigabit Ethernet (GigE) and/or Fibre Channel and/or SONET compliant systems.

Figure 1:
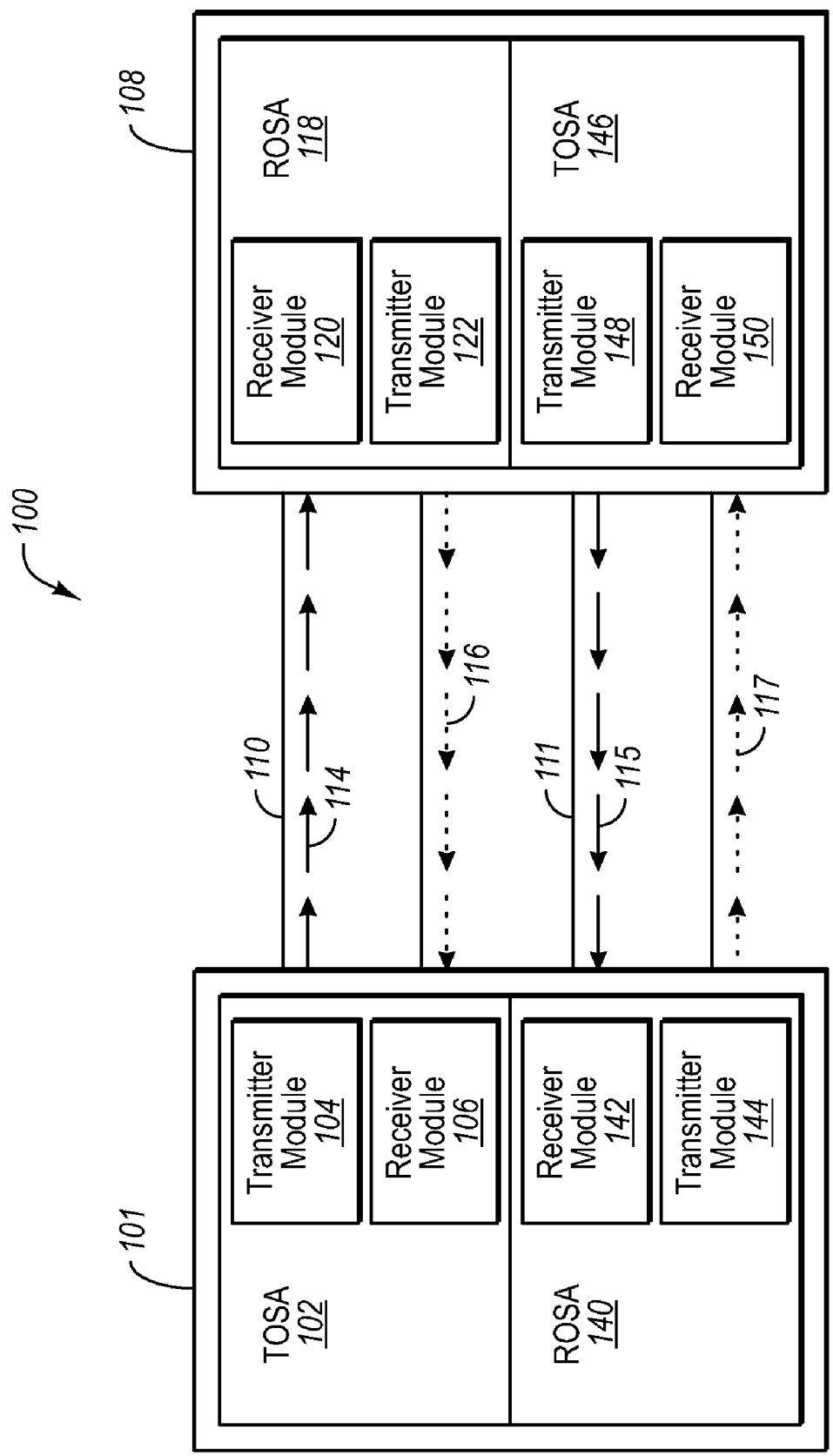
FIG. 1 is a schematic diagram that illustrates aspects of an exemplary embodiment of a duplex bidirectional transceiver system.

FIG. 1 is a schematic diagram that illustrates an exemplary embodiment of a bidirectional optical data communication system 100 in accordance with the present invention. FIG. 1 illustrates transceiver modules 101, 108 that are similarly configured, and are connected with the optical fibers 110, 111 and thus form an optical link. As described herein, the optical fibers 110, 111 are each a single fiber, however, multiple optical fibers can be utilized to link the transceiver modules 101, 108 when appropriate. Each transceiver module 101, 108 includes a 'transmit' optical subassembly ("TOSA") 102, 146 and a 'receive' optical subassembly ("ROSA") 118, 140.

In this example, the optical signal generated by each TOSA 102, 146 is received by a corresponding ROSA 118, 140 through the optical fibers 110, 111. The optical fibers 110, 111 can include new or legacy fibers, and some exemplary embodiments of the present invention can be implemented without necessitating any change in existing optical fibers and/or connectors.

Each TOSA 102, 146 includes a transmitter module 104, 148, and a receiver module 106, 150. Each ROSA 118, 140 similarly includes a transmitter module 122, 144 and a receiver module 120, 142. By using the transmitter modules 104, 122, 144, 148 and receiver modules 106, 120, 142, 150, the transceiver modules 101, 108 can perform bidirectional communication over each of the optical fibers 110, 111. Thus the TOSA 102 and the ROSA 118 can communicate bidirectionally over the optical fiber 110. The ROSA 140 and the TOSA 146 can similarly communicate bidirectionally over the optical fiber 111.

In one embodiment, the communication links between the transmitter modules 104, 148 and the receiver modules 120, 142 can transmit data payloads 114, 115 over the optical fibers 110, 11. Accordingly, the transmitter modules 104, 148 can be designated as primary transmitter modules 104, 148. Correspondingly, the receiver modules 120, 142 can be designated as primary receiver modules 120, 142.

Also, the communication link between the transmitter modules 122, 144 and the receiver modules 106, 150 can transmit diagnostic data signals 116, 117 over the optical fiber 110, 111. As such, the transmitter modules 122, 144 can be designated as secondary transmitter modules 122, 144. Correspondingly, the receiver modules 106, 150 can be designated as secondary receiver modules 106, 150.

The inclusion of transmitters in a ROSA and receivers in a TOSA allows for both the ROSA and the TOSA to each transmit and receive data. Accordingly, the transmitters in the TOSA can be considered primary and the receivers within the TOSA can be considered secondary because the TOSA transmitters are primarily transmitting the data payload and the TOSA receivers are performing a secondary function of receiving diagnostic data about that data payload. Similarly, the receivers in the ROSA can be considered primary and the transmitters within the ROSA can be considered secondary because the ROSA receivers are primarily receiving the data payload and the ROSA transmitters are transmitting diagnostic information about the optical quality of the received data payload back to the originating TOSA. This can be useful because the information received by a ROSA may have an inadequate optical quality, and providing the ROSA with the transmission capability can allow for diagnostic data pertaining to the inadequate optical quality to be transmitted back to the originating TOSA. Accordingly, the TOSA can then adjust the transmission to improve the optical quality received at the ROSA.

With continuing reference to FIG. 1, the transceivers 101, 108 can each implement closed-loop digital diagnostics and transfer diagnostic data 116, 117 from each ROSA 118, 140 back to its corresponding TOSA 102, 146 using the secondary transmitter 122, 144 and secondary receiver modules 106, 150. The optical fibers 110, 111 can carry data payloads 114, 115 and diagnostic data 116, 117 in both directions across the optical fiber.

One advantage of the present invention, in comparison to conventional bidirectional systems is that the diagnostic data transmitted, for example, by the secondary transmitter modules 122, 144 does not consume any of the bandwidth available to the primary transmitter modules 104, 148. This is because the primary and secondary transmitters that transmit signals over the same optical fiber can propagate the data at different wavelengths.

Figure 2:
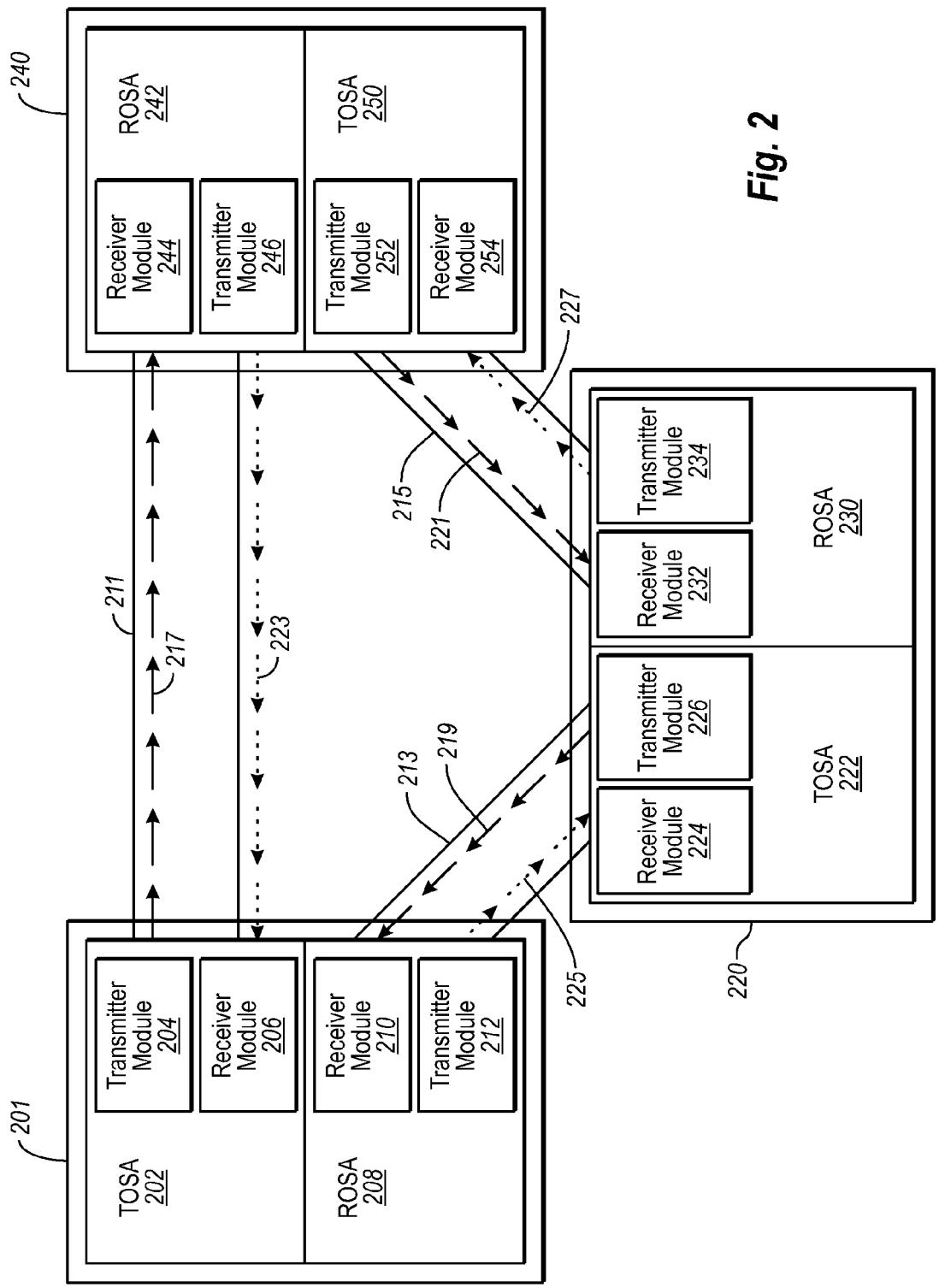
FIG. 2 is a schematic diagram that illustrates aspects of an exemplary embodiment of duplex bidirectional transceiver assemblies within a duplex bidirectional communication system.

Referring now to FIG. 2, details are provided concerning the general architecture of an exemplary embodiment of the present invention that includes a multi-node communication system 200. Such a multi-node communication system 200 can include multiple independent transceivers 201, 220, 240. Each transceiver 201, 220, 240 includes a TOSA 202, 222, 250 and a ROSA 208, 230, 242. Accordingly, the TOSA 202 is in communication with the ROSA 242 over optical fiber 211, the TOSA 222 is in communication with the ROSA 208 over optical fiber 213, and the TOSA 250 is in communication with the ROSA 230 over optical fiber 215.

Additionally, each TOSA 202, 222, 250 includes a transmitter module 204, 226, 252 and a receiver module 206, 224, 254. The transmitter modules and receiver modules of the transceivers 201, 220, 240 can be either primary or secondary modules as described previously with respect to FIG. 1.

An advantage of the present inventive multi-node communication system 200 allows for closed-loop digital diagnostics between two communicatively coupled transceivers within a multi-node communication system over a single optical fiber. For example, the TOSA 202 can communicate with the ROSA 242. As such, the TOSA 202 can transmit a data payload 217 over optical fiber 211 to the ROSA 242, and the ROSA 242 can transmit diagnostic data 223 pertaining to the signal quality of the data payload 217 back to the originating TOSA 202 over the same optical fiber 211.

This multi-node communication system configuration allows for a ROSA to analyze the optical quality of the data payload sent by a TOSA, and then transmit diagnostic information back to the TOSA so that the data payload signal can be adjusted to improve the optical quality. Thus, closed-loop feedback control can be implemented between each TOSA and ROSA within a multi-node network to improve the quality of the data payload signals. Additionally, the multi-node communication system can include a plurality of transceivers where each TOSA and ROSA communication linked together over a single optical fiber, as exemplified by TOSA 202 and ROSA 242, can implement the closed-loop feedback control. Also, is should be appreciated that a multi-node communication system can include more than just three nodes as exemplified.

Structure

Figure 3:
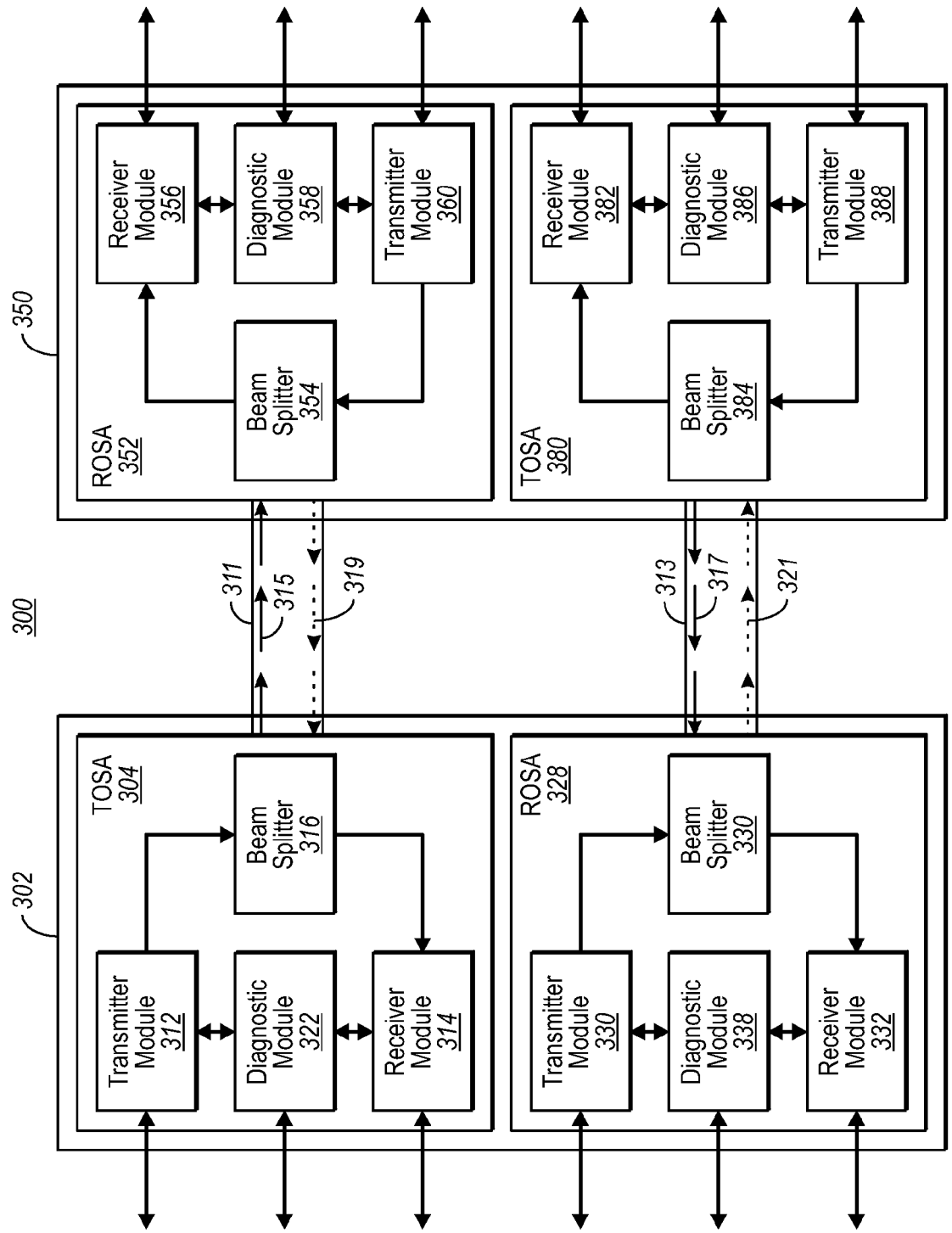
FIG. 3 is a schematic diagram that illustrates an embodiment of a bidirectional transceiver module operable within a duplex bidirectional communication system.

With reference now to FIG. 3, another exemplary embodiment of the present invention includes details of bidirectional optical communication between a two-node pair 300, although one of skill in the art can appreciate that the embodiments of the invention can be implemented in a multimode system as well. Such an embodiment can include first and second transceiver modules 302, 350, which can be identical modules, each having a pair of bidirectional subassemblies. The first transceiver module 302 includes a bidirectional TOSA 304 and a bidirectional ROSA 328. Also, the second transceiver module 350 includes a bidirectional ROSA 352 and a bidirectional TOSA 380. Each of the bidirectional subassemblies in the first transceiver module 302 are in communication with their corresponding bidirectional subassemblies in the second transceiver module 350 through the optical fibers 311, 313.

Each of the bidirectional subassemblies within the transceivers 302, 350 can include various modules. As such, the TOSA 304 includes a primary transmitter module (PTxM) 312 and a secondary receiver module (SRxM) 314, and the ROSA 352 includes a primary receiver module (PRxM) 356 and a secondary transmitter module (STxM) 360. Also, the ROSA 328 includes a primary receiver module (PRxM) 332 and a secondary transmitter module (STxM) 330, and the TOSA 380 includes a primary transmitter module (PTxM) 388 and a secondary receiver module (SRxM) 382. These modules are configured to be in communication with their counterparts in the bidirectional system through optical fibers 311, 313.

The transmitter modules can be configured to provide different wavelengths. For example without limitation, the TOSA 304 PTxM 312 can be a 1550 nanometer (nm) distributed feedback (DFB) laser, thereby providing a first wavelength data transmission ($\lambda_1$) to communicate the data payload 315. On the other hand, the ROSA 352 STxM 360 can be, also by way of example only, a 1310 nm Fabry Perot (FP) laser, thereby providing a second wavelength data transmission ($\lambda_2$) to communicate the diagnostic data 319. Thus, the first and second wavelength data transmissions for the payload data ($\lambda_1$) and diagnostic data ($\lambda_2$) can be propagated over the same optical fibers in opposite directions. Additionally, the receiver module can include photodetector, such as a photodiode to detect the incoming data signals.

With respect to the TOSA 304 and the ROSA 352 communicative pair, the PTxM 312 is communicatively coupled to a first end of an optical fiber 311 through a beam splitter 316 and the PRxM 356 is communicatively coupled to a second end of the optical fiber 310 through another beam splitter 354. As such, the PTxM 312 can transmit a data payload 315 to the PRxM 356 over the optical fiber 311. Additionally, the STxM 360 is communicatively coupled to the second end of the optical fiber 311 through the beam splitter 354, and the SRxM 314 is communicatively coupled to the first end of optical fiber 311 through the beam splitter 316, where the STxM 360 can transmit diagnostic data 319 to the SRxM 314.

In accordance with the present invention, the beam splitters of the TOSA and the ROSA can be similar and even configured to be identical when appropriate. The beam splitters can be configured to separate two different wavelengths transmitted from the TOSA and from the ROSA because both optical signals will pass through each beam splitter at the TOSA and the ROSA. The beam splitter can receive a signal from a transmitter module at a first wavelength ($\lambda_1$) and route the signal into the optical fiber. From the opposite direction, the beam splitter can also receive a second signal at a second wavelength ($\lambda_2$) from the same optical fiber. The beam splitter then reflects the second signal at the second wavelength ($\lambda_2$) towards the receiver module. Accordingly, the TOSA beam splitter can transmit $\lambda_1$ and reflect $\lambda_2$, while the ROSA beam splitter can transmit $\lambda_2$ and reflect $\lambda_1$. For example without limitation, the exemplary transmitter wavelengths of approximately 1310 nm for the secondary transmitter and 1550 nm for the primary transmitter can be distinguished with a beam splitter having high reflectivity for either the 1310 nm or 1550 nm wavelength bands and a high transmission for the other wavelength. One of skill in the art can appreciate that other wavelengths can be used to implement the closed loop diagnostics.

In an alternative embodiment of the present invention, the bidirectional optical data communication system described herein does not require the primary transmitters that transmit the data payload and secondary transmitters that transmit the diagnostic data to transmit significantly different wavelengths. Each transceiver module can include an echo cancellation device configured to remove the crosstalk and/or reflected transmission optical signals that are not intended to be received by the receiver. For example, when some portion of the payload data signal is reflected back into the transceiver, an echo cancellation device can extinguish the payload data signal from the diagnostic data signal so as to prevent the diagnostic data signal from being corrupted by reflected signals. In one aspect, the echo cancellation device can be part of the beam splitters.

With continuing reference to FIG. 3, while the PTxM 312 is communicatively coupled to the beam splitter 316 the beam splitter 316, is also communicatively coupled to the SRxM 314. This can allow optical data received into the beam splitter 316 from the optical fiber 311 to pass to the SRxM 314. Additionally, the SRxM 314 is communicatively coupled to a diagnostic module 322, which in turn is then communicatively coupled to the PTxM 312. This can allow the SRxM 314 to transfer diagnostic data to the diagnostic module 322 so that transmission control parameters can be transferred to the PTxM 312 for improving the quality of the data payload signal. Thus, the TOSA 304 can self-adjust the optical data transmission signal by using the received diagnostic data.

Additionally, with a more specific reference to ROSA 352, the beam splitter 354 is configured to receive the data payload 315 from the optical fiber 311, and transfer the data payload 315 to the PRxM 356. The PRxM 356 is also communicatively coupled to a diagnostic module 358, which in turn is communicatively coupled to the STxM 360. This enables the PRxM 356 to transfer information pertaining to the incoming data payload 315 or a portion of the data payload to the diagnostic module 358, where the diagnostic module can then analyze the quality of the data payload 315 to determine whether the quality is adequate or needs improvement. As such, the diagnostic module 358 can then generate diagnostic data 319 pertaining to the quality of the data payload 315 signal, which can then be transferred to the STxM 360. The STxM 360 is configured to transmit the diagnostic data 319 to the beam splitter 354, which routes the diagnostic data 319 into the optical fiber 311 for transmission to the corresponding TOSA 304.

Since the transceiver modules 302, 350 are substantially identical, with the TOSA 304 communicating with the ROSA 352 being substantially identical to the TOSA 380 communicating with the ROSA 328, the TOSA 380 and the ROSA 328 operate as described above. In other words, the ROSA 328 functions similarly to the ROSA 352 and the TOSA 380 functions similarly to the TOSA 304.

An exemplary embodiment of the present invention can include the transceiver modules 302, 350 to be each coupled with a host computing system ("host") (not shown). The TOSA 304, 380 and the ROSA 352, 328 can be coupled to a host via any of the subassemblies.

In another embodiment, the optical transceiver of the instant invention can include additional components. Some of the additional components that can be included within a receiving aspect of the transceiver can include transimpedance amplifiers, post-amplifiers, detector and loss of signal detectors for processing the data signal that is received into the receiver module. Additionally, the transmitter module can include a laser, laser driver, laser driver power controller, monitor, and auto-shutdown controller. The receiver module and transmitter module components can be controlled with a control module that can adjust settings of the transceiver.

Figure 4:
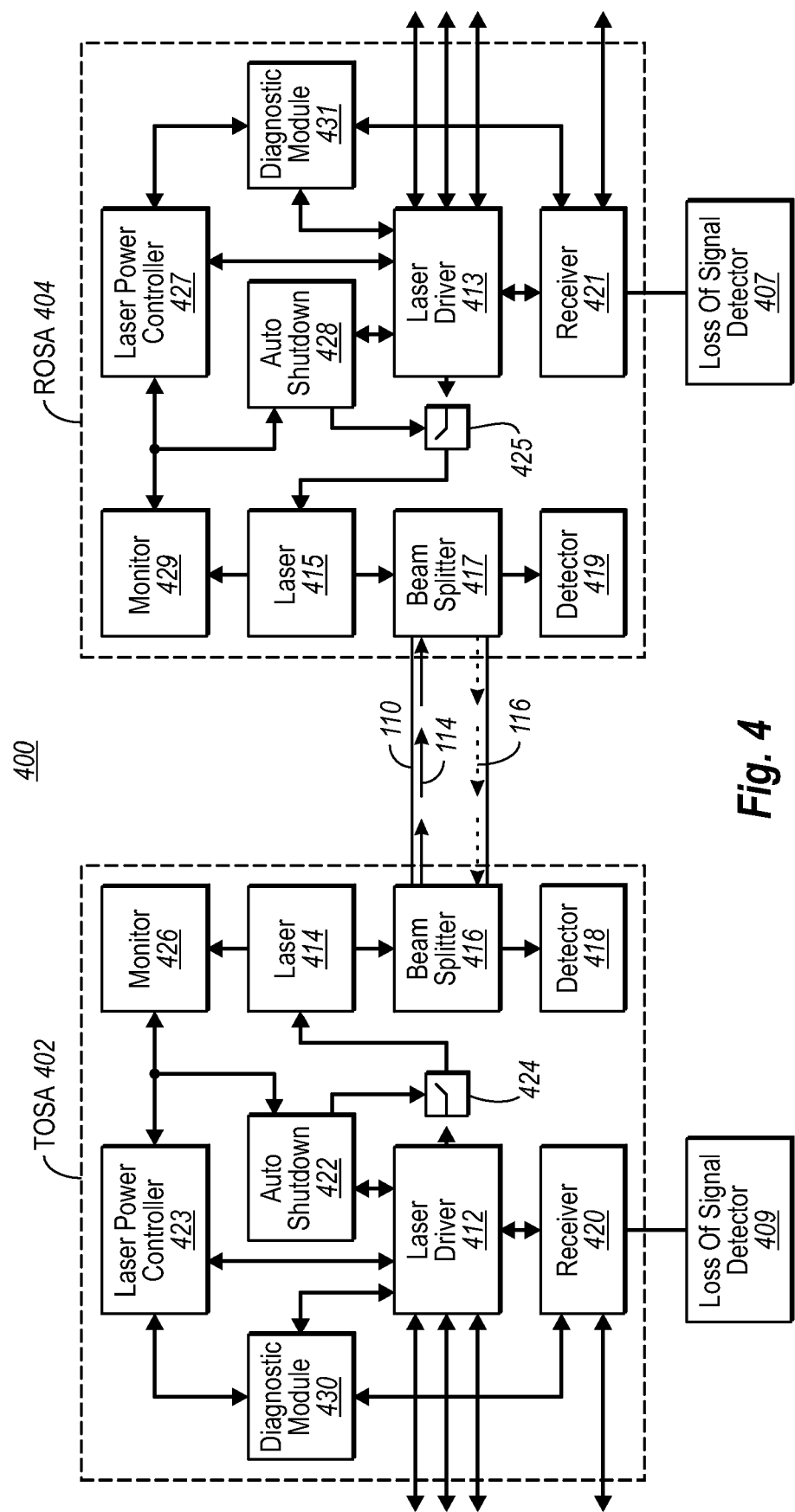
FIG. 4 is a schematic diagram that illustrates an embodiment of bidirectional transceiver modules operable in a bidirectional communication system.

Referring now to FIG. 4, a detailed exemplary embodiment of the present invention includes a TOSA 402 in communication with a ROSA 404. The TOSA 402 and the ROSA 404 are configured to communicate via an optical fiber 110, where the TOSA 402 sends a data payload 114 to the ROSA 404 and the ROSA sends diagnostic data 116 to the TOSA 402. Accordingly, both the TOSA 402 and the ROSA 404 include components to enable bidirectional communication over the single optical fiber 110. In one aspect, the TOSA 402 and the ROSA 404 can each be independently coupled with a host.

The TOSA 402 can be configured to receive data input from the host into a laser driver 412, where the data received into the laser driver 412 is converted into signals to be emitted from a laser 414 as a data payload 114 optical signal. One such data input received into the laser driver 412 can be a transmission disablement input (TxDIS) that disables the data transmission from the laser driver 412 to the laser 414.

Within the TOSA 402, a laser driver power controller 426 is coupled with and regulates the laser driver 412. Also, the laser driver 412 is communicatively coupled with the laser 414 so that the laser driver 412 can provide power and modulation parameters to the laser 414 to control the optical data signal transmission characteristics.

The laser 414 emits light carrying the optical data to a beam splitter 416, where at least a portion of the laser light can be transferred to a laser monitor 428 to determine the characteristics of the laser transmission power and/or modulation. The beam splitter 416 then routes the optical data signal into the optical fiber 110 to transmit the data payload 114 to the ROSA 404.

The laser monitor 426 receives and analyzes the laser transmission power and/or modulation in order to provide the laser driver 412 with instructions for adjustments to correct the laser transmission characteristics. As such, the laser monitor 426 transfers the information pertaining to the laser transmission to the laser driver power controller 423 and an auto-shutdown controller 422. The laser power controller 423 is configured to provide the laser driver 412 with power and/or modulation adjustments so that the laser 414 can emit a signal with improved quality. As such, the monitor 426, laser power controller 423, and auto-shutdown controller 422 can adjust the quality of the optical signal through an internal control mechanism and/or procedure within the TOSA 402.

Additionally, the auto-shutdown controller 422 is communicatively coupled with the laser driver 412 so that when the laser monitor 426 indicates that the laser transmission should be shut down, the laser driver 412 can cease transferring data to the laser 414. In another aspect, the auto-shutdown controller 422 can be communicatively coupled with an auto-shutdown assembly 424, where this redundant communication system can allow for the auto-shutdown controller 422 to sever the data connection to the laser 414. This optional aspect can be implemented when the laser driver 412 does not respond to the auto-shutdown controller 422.

The beam splitter 416 is coupled to the optical fiber 110 so as to transmit the data payload 114 and to receive the diagnostic data 116 sent from the ROSA 404. The beam splitter 416 is also communicatively coupled to detector 418 to communicate the diagnostic data 116 received from the ROSA 404 to the detector 418. After the detector 418 receives the diagnostic data 116 from the beam splitter 416, the optical diagnostic data 116 is typically converted to a corresponding electrical data signal. Also, the detector 418 is communicatively coupled to a receiver 420 so that the electrical diagnostic data can be transferred to the receiver 420.

When the receiver 420 obtains the diagnostic data, the data can be processed and/or analyzed for power and/or modulation parameters, which can include the power and/or modulation parameter of either the transmission signal emitted by the TOSA 402 or ROSA 404. Also, the receiver 420 can be coupled to a loss of signal detector ("LOS") 409, which can detect the signal power and associated current or voltage parameters to determine whether the received diagnostic data signal is sufficiently powerful. The receiver 420 can be configured to have more than one output, which can transfer the received diagnostic data to a host or to a diagnostic module 430 or directly to the laser driver 412.

The diagnostic module 430 can be configured to receive the diagnostic data for processing and/or analysis to determine whether any of the laser transmission parameters could be adjusted to provide a better signal at the receiving ROSA 404. Such laser transmission parameters can include, without limitation, laser power and/or modulation. For example, the diagnostic module 430 can interpret the diagnostic data to determine whether the laser power at the receiving transceiver is inadequate, and then implement a power increase command. Accordingly, the diagnostic module 430 can send the power increase command to the laser driver power controller 426 or to the laser driver 412 to increase the power of the laser 414.

For example, the diagnostic module 430 can interpret the diagnostic data to indicate that the laser modulation is improper and the signal being received by the ROSA 404 is unacceptable or unreadable. The diagnostic module 430 can then implement a modulation adjustment command and send the command to the laser driver 412 to adjust the laser modulation. Of course other laser adjustments can be made in accordance with the transmission signal characteristics received by the ROSA 404, and any of the TOSA 402 components can be configured to make the proper adjustments to obtain an adequate data transmission signal.

In another embodiment, the ROSA 404 is configured to receive the payload data 114 transmitted from the TOSA 402 via the optical fiber 110 and transmit the diagnostic data 116 over the same optical fiber 110. The optical fiber 110 is coupled to a beam splitter 417 which routes the payload data 114 to a detector 419. The beam splitter 417 is communicatively coupled with the detector 419 so that the received optical data payload 114 can be converted to electrical data for further processing and distribution. The beam splitter 417 is also communicatively coupled to a laser 415.

The detector 419 is also communicatively coupled with the receiver 421 so that the data received into the ROSA 404 can be transferred to the receiver 421. The receiver 421 can process and/or analyze the received data, and transfer the data payload to the host computing system. Also, the receiver can be communicatively coupled to a loss of signal detector (LOS) 407. The receiver 421 can be configured to have more than one output, which can transfer the received data to a host or to a diagnostic module 431 or directly to the laser driver 413.

The diagnostic module 431 is configured to receive data from the receiver 421 for processing and/or analysis of the data payload 116 to determine whether any of the TOSA 402 laser transmission parameters could be adjusted in order to provide better signal quality at the ROSA 404. The laser transmission parameters can include, without limitation, laser power and/or modulation. For example, the diagnostic module 431 can analyze the data payload signal and determine the laser power being received into the ROSA 404 to be inadequate, and then generate diagnostic data for instructing the TOSA 402 to implement a power increase command. Alternatively, the closed-loop diagnostics can be used to lower the laser power of the TOSA 402 if the ROSA 404 is being saturated.

The diagnostic module 431 then sends the diagnostic data to a laser driver power controller 427 or to a laser driver 413 for transmission back to the TOSA 402. Accordingly, the laser power controller 427 and/or the laser driver 413 can direct the laser 415 to transmit an optical signal carrying the diagnostic data to the TOSA 402, where a laser 415 emits light into the beam splitter 417 which is then routed into the optical fiber 110.

Additionally, a monitor 429 can receive some of the optical data signal from the laser 415 to determine the characteristics of the diagnostic laser transmission power and/or modulation. The monitor 429 can analyze the laser transmission power and/or modulation in order to provide the laser driver 413 with adjustments to correct the laser transmission. As such, the monitor is configured to transfer the information pertaining to the laser transmission to the laser driver power controller 427 and the auto-shutdown controller 428.

The laser power controller 427 is configured to provide the laser driver 413 with power and/or modulation adjustments so that the laser 415 can emit an improved signal from the ROSA 404. Also, the auto-shutdown controller 428 can be communicatively coupled with the laser driver 413 to terminate transmission of the diagnostic data signal when the monitor indicates that the laser should be shut down. Additionally, the auto-shutdown controller 428 can be communicatively coupled with the diagnostic auto-shutdown assembly 425 to provide a redundant system to terminate the transmission of the diagnostic data when the laser driver 413 does not respond to the auto-shutdown controller 428.

In another embodiment of the present invention, the ROSA 404 can be configured to receive data input from the host into the laser driver 413, where the data received into the laser driver 413 from the host is converted into signals to be emitted from the laser 415. Such data can be carried through the optical fiber 110 along with the diagnostic data signal. Accordingly, the ROSA 404 can be configured to transmit a data payload along with the diagnostic data 116 to the TOSA 402. Thus, the laser driver 413 can have more than one input from the host, which can include a transmission disablement input (TxDIS) and data payload inputs.

In another exemplary embodiment of the present invention, the TOSA diagnostic modules, shown in FIGS. 3 and 4 that primarily serve to provide the laser with adjustment commands to adjust the laser signal in order to provide the corresponding ROSA with an adequate data signal, are optional. Accordingly, these diagnostic modules can be incorporated into the primary transmitter modules or the secondary receiver modules of FIG. 3 and any of the TOSA components of FIG. 4. Thus, these diagnostic modules can be incorporated into any part of the TOSA so long as the laser transmission characteristics are adjustable at the TOSA in order to provide the ROSA with an adequate data signal. For example, with reference back to FIG. 3, the diagnostic module 322 of the TOSA 304 can be incorporated into the secondary receiver module 314. As such, the receiver module 314 can instruct the transmitter module to change the laser transmission characteristics in accordance with the signal quality needs at the corresponding ROSA 352.

Similarly, another exemplary embodiment of the present invention provides for the ROSA diagnostic modules shown in FIGS. 3 and 4 that primarily serve to generate diagnostic data about the quality of the payload data received into the ROSA to be optional. As such, these diagnostic modules can be incorporated into the primary receiver modules or secondary transmitter modules of FIG. 3, and any of the ROSA components in FIG. 4 so long as the ROSA is capable of generating diagnostic data for closed-loop feedback control of the transmitted signal.

In another aspect, the optical signal transmitting components (e.g., laser or light emitting diode) used in the secondary transmitter that transmits the diagnostic data back to the originating transceiver can be of lower quality than the originating primary transmitter. The diagnostic data does not require as much bandwidth as the primary transmitter, for example. Also, the secondary optical signal receiving components such as a photodiode can be of lower quality than the primary receiver. Accordingly, manufacturing rejects for primary transmitters and primary receivers can be adequately used as secondary transmitters and secondary receivers, which can decrease overall costs.

Methods of Operation

In practicing the invention, the transceiver modules, components, and subcomponents can be operable in a closed-loop feedback controlled bidirectional optical data network system. The system can be configured to bidirectionally transmit and receive data over a single optical fiber. A transceiver having a transmit port and a receive port can transmit bidirectionally over two fibers. In such a system, methods can be implemented for closed-loop feedback control of the TOSA laser transmission characteristics. Accordingly, an optical transceiver module can automatically adjust, for example, the power and/or modulation of a transmitted signal to maintain the integrity of a data link.

Figure 5:
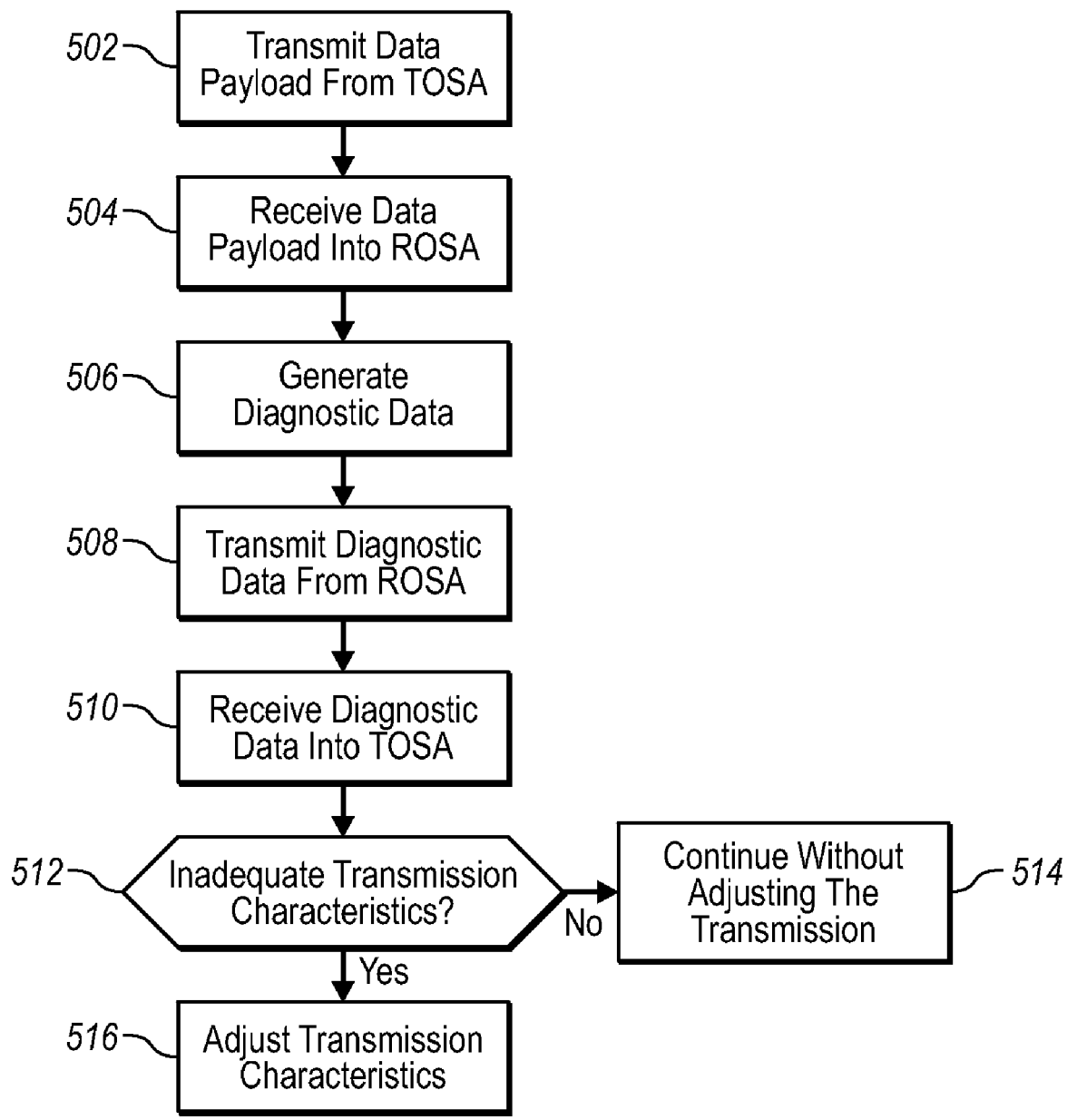
FIG. 5 is a flow diagram that illustrates some aspects of an exemplary method operable with a duplex bidirectional communication system.

With reference to FIG. 5, an exemplary embodiment of the present invention provides a method 500 for implementing closed-loop feedback control of the laser transmission between two or more transceiver modules, each including a TOSA and a ROSA. Accordingly, the TOSA of a transceiver transmits a data signal to the ROSA of another transceiver (stage 502). As such, the ROSA receives the data signal sent from the TOSA (stage 504). After the data signal has been received into the ROSA, diagnostic data pertaining to the data signal is generated (stage 506) in the ROSA. The diagnostic data can be generated to identify the adequacy or inadequacy of the data signal at the site of reception. Thus, the diagnostic data can indicate whether the transmission needs to be increased in power or whether the modulation characteristics need adjusting.

The diagnostic data is then transmitted from the ROSA (stage 508), which is then received into the originating TOSA (stage 510). The TOSA can then determine whether the diagnostic data indicates whether the transmission characteristics are adequate or inadequate (stage 512). When the diagnostic data indicates the data signal received into the ROSA is adequate, the TOSA can continue transmission without adjusting the characteristics of the laser (stage 514). On the other hand, when the diagnostic data indicates that the transmission characteristics are inadequate when received into the ROSA, the TOSA can adjust the appropriate laser transmission characteristics (stage 516), such as power and/or modulation.

In another exemplary embodiment of the present invention, a method for implementing closed-closed loop digital diagnostics can operate continuously. While the TOSA is transmitting a data payload to the ROSA, the ROSA can simultaneously transmit diagnostic data back to the originating TOSA. This can provide continuous adjustments in order to maintain a high quality for the signals being transmitted.

With respect to the aspect of generating diagnostic data, the generation can be by any process and utilize any portion of the data payload that results in diagnostic data pertaining to the data payload. The diagnostic data allows the transceiver originating the data payload to alter the power and/or modulation of the transmission signal to improve the data signal characteristics at the receiving transceiver. Such diagnostic data generation can include: taking a portion of the data signal and transferring it back to the originating transceiver; processing the data signal through an algorithm to obtain information about the signal; measuring signal parameters and transferring the parameters back to originating transceiver; and/or creating data that indicates the adequacy or inadequacy of the signal characteristics.

Additional Embodiments

Figure 6:
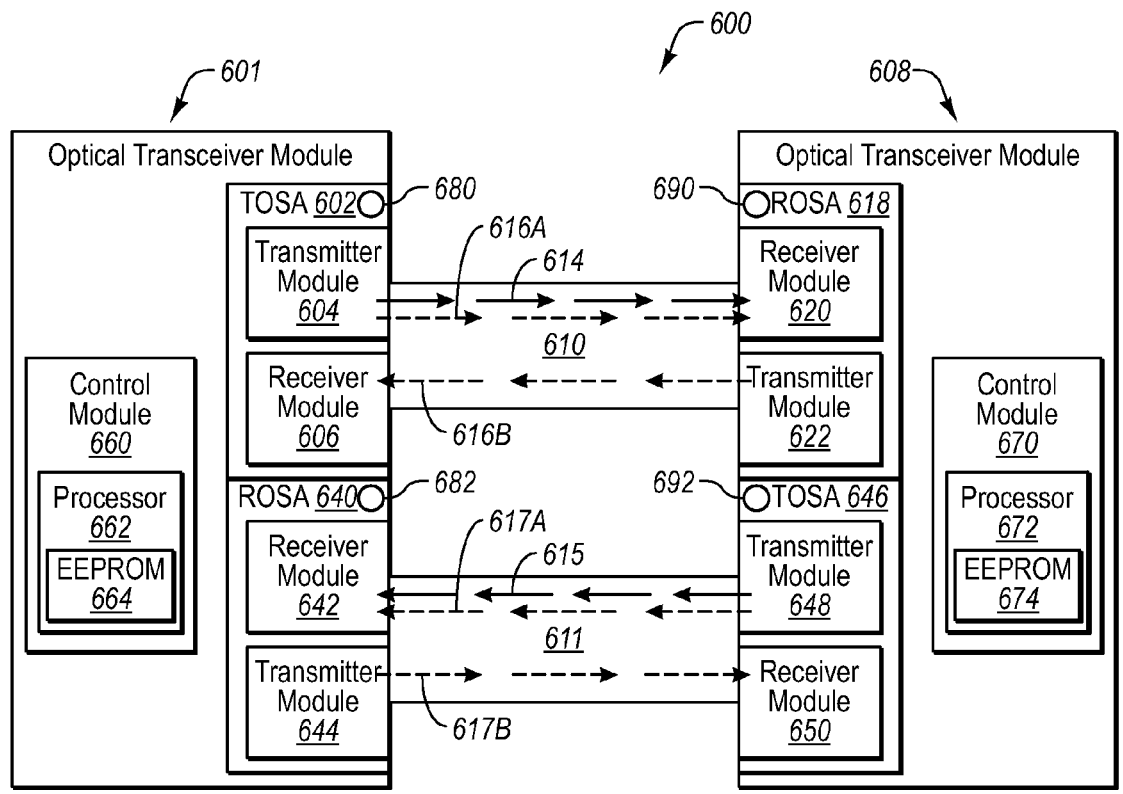
FIG. 6 is a simplified schematic diagram that illustrates a bidirectional communication system including elements of the present invention according to one embodiment.

Reference is now made to FIG. 6 in describing various details regarding a bidirectional optical data communication system, generally designated at 600, which is configured in accordance with another embodiment of the present invention. As shown, the system 600 is configured similarly to the system 100 depicted in FIG. 1. As such, only selected features and details regarding the components of the system 600 are discussed below. Generally, FIG. 6 and the succeeding figures depict embodiments of the present invention directed toward validation of a fiber optic data link between communication modules, such as optical transceiver modules, which are configured with bidirectional communication capability. This in turn enables a "link indicator" to be present at both ends of the fiber optic data link in a manner analogous to link indicators used with electrically-based data links, such as CAT-5 and LAN copper cable links, for example. Thus a determination of whether a physical, operable optical link has been established between transceivers can readily be made at the transmitter end by inspection of the link indicator, thereby increasing link reliability. Significantly, link indication in this manner is host independent; in other words, no active participation is required by the hosts housing the transceivers, other than provision of a power supply thereto.

The system 600 includes first and second optical transceiver modules 601 and 608 that are operably interconnected via optical fibers 610 and 611. The operable connection of the transceivers 601 and 608 via the optical fibers 610 and 611 is at least an indirect connection that is configured such that optical signals, when a data link is established, can pass between the transceivers in a manner well known in the art.

In further detail, the transceiver 601 includes a TOSA 602 having a transmitter module 604 and a receiver module 606. The transmitter module 604 and receiver module 606 are operably connected to a receiver module 620 and transmitter module 622, respectively, of a ROSA 618 that is included in the transceiver 608, via the optical fiber 610. As such, data payload signals 614 can be transmitted by the transmitter module 604 of the TOSA 602 to the receiver module 620 of the ROSA 618 during operation of the transceivers 601 and 608. Because of the bidirectional optical signal transfer capability of the transceivers 601 and 608, however, validating signals 616A and 616B can also be transmitted from the transmitter module 604 of the TOSA 602 to the receiver module 620 of the ROSA 618, and from the transmitter module 622 of the ROSA 618 to the receiver module 606 of the TOSA 602. The data signals 614 and validating signals 616 therefore travel via a data link that can be established between the TOSA 602 of the transceiver 601 and the ROSA 618 of the transceiver 608 via the optical fiber 610.

The transceiver 608 also includes a TOSA 646 having a transmitter module 648 and a receiver module 650. The transmitter module 648 and receiver module 650 are operably connected to a receiver module 642 and transmitter module 644, respectively, of a ROSA 640 that is included in the transceiver 601, via the optical fiber 611. As such, data payload signals 615 can be transmitted by the transmitter module 648 of the TOSA 646 to the receiver module 642 of the ROSA 640 during operation of the transceivers 601 and 608. Because of the bidirectional optical signal transfer capability of the transceivers 601 and 608, however, validating signals 617A and 617B can also be transmitted from the transmitter module 648 of the TOSA 646 to the receiver module 642 of the ROSA 640, and from the transmitter module 644 of the ROSA 640 to the receiver module 650 of the TOSA 646. The data signals 615 and validating signals 617 therefore travel via a data link that can be established between the TOSA 646 of the transceiver 608 and the ROSA 640 of the transceiver 601 via the optical fiber 611.

The validating signals 616 and 617 described above are employed in embodiments of the present invention to provide a "link indicator" as part of a validating procedure for ensuring a data link is acceptably established between the transceivers 601 and 608. For purposes of the present discussion, therefore, the term "validating signals" is meant to include any data that are transmitted between communication modules, such as optical transceiver modules, and that provide information regarding, or that can be used to determine, the status of a potential or actual communicative link between the modules. It is therefore appreciated that the validating signals comprise a portion of the data signal sent by either transceiver, or can be a separate signal sent independently of the data signal, as will be described.

Note that in the present embodiment shown in FIG. 6, both the data signal 614 and the validating signal 616A are produced by a single laser (not shown) included in the transmitter module 604 of the TOSA 602 of the transceiver 601. As such, both the data signal 614 and validating signal 616A have the same wavelength. In contrast, the validating signal 616B is produced by a separate laser (not shown) disposed in the transmitter module 622 of the ROSA 618 of the transceiver 608. This laser necessarily has a different wavelength than the laser disposed in the transmitter module 604 that produces the data signal 614 and validating signal 616A. The same applies to the ROSA/TOSA pair 640/646 shown in FIG. 6: data signal 615 and validating signal 617A are produced by the same laser in transmitter module 648 and have the same wavelength, while the validating signal 617B is produced by a different laser disposed in the transmitter module 644 and as such has a wavelength distinct from that of the data signal 615 and validating signal 617A. More information regarding the validation signals and validation of the transceiver-to-transceiver data link via a link indicator is given below.

Note that the configuration shown in FIG. 6 shows two transceivers operably connected. However, this is merely exemplary of many such transceiver pairs that can be included in remotely disposed host devices within a communication network. FIG. 6 further depicts the transceiver 601 as including a control module 660 having a processor 662. Similarly, the transceiver 608 includes a control module 670 having a processor 672. The control modules 660 and 670 are employed by the transceivers 601 and 608 to control specified aspects of transceiver functionality, including optical signal transmission and reception. The processors 662 and 672 of the control modules 660 and 670 can be utilized to assist in implementing control of transceiver functionality by executing predetermined microcode routines in a digital manner. Alternatively, the control modules 660 and 670 can be analog-based. Together with their respective processors 662 and 672, the control modules 660 and 670 are employed in one embodiment in performing link validation of operably connected transceivers, such as those in FIG. 6, as will be explained in further detail below. In one embodiment, the control modules 660, 670 can also include volatile and/or persistent memory for storing microcode routines or data retrieved by the respective transceiver regarding link indicator status for later access by the host device or user. In the present embodiment, for example, each processor 662, 672 includes an EEPROM memory 664, 674, respectively.

The TOSA 602 and ROSA 640 of the first transceiver 601 each include an indicator light 680 and 682, respectively. Similarly, the ROSA 618 and TOSA 646 of the second transceiver 608 each include an indicator light 690 and 692, respectively. The indicator lights 680, 682, 690, and 692 serve as visual indicators of link status during or before transceiver operation. Thus as will be explained, the indicator lights 680, 682, 690, and 692 assist a technician in determining whether an acceptable optical data link has been established between the transceivers 601 and 608.

Together with FIG. 1, reference is now made to FIGS. 7A-7E in describing various details regarding link validation between the first and second transceivers 601 and 608 in order to verify the acceptable establishment of a data link therebetween, according to one embodiment. Note that these figures are simplified for purposes of describing the features of the present embodiment, and as such some details of the depicted components have been omitted for clarity.

Figure 7A:
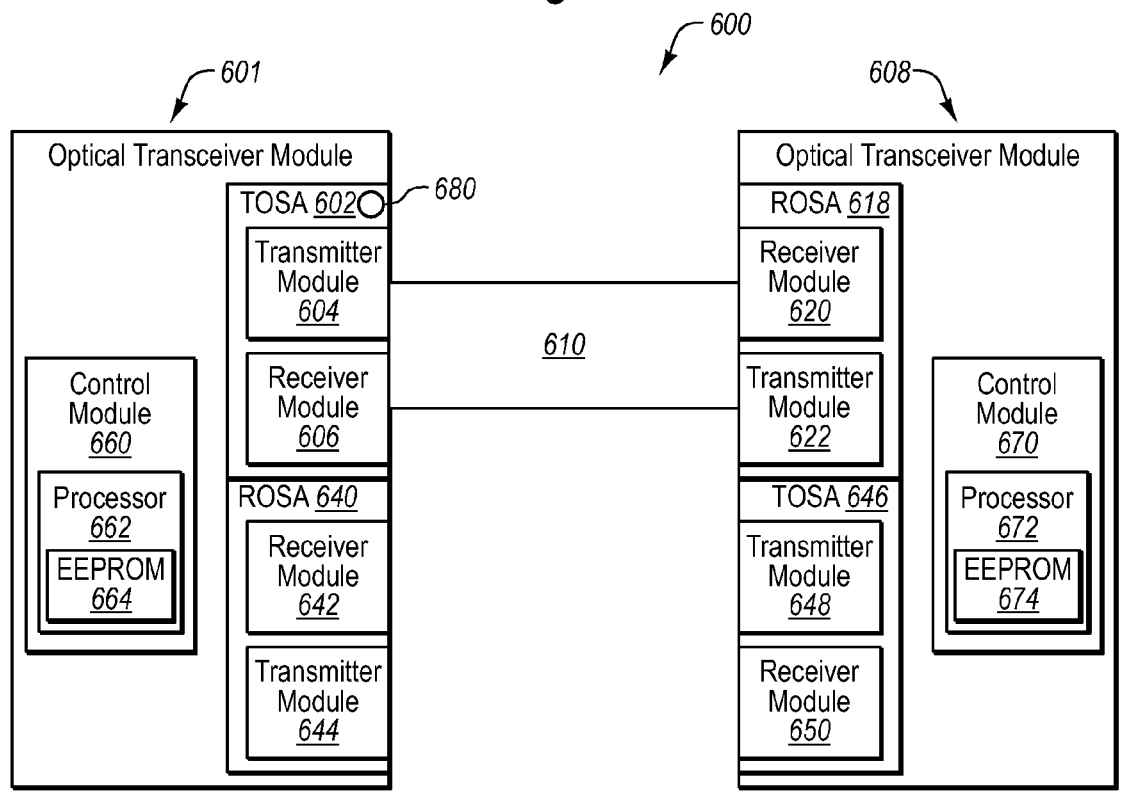
FIGS. 7A-7E are simplified schematic diagram that illustrates various details regarding the operation of a bidirectional communication system in accordance with one embodiment.

As shown in FIG. 7A, in order to validate or establish an acceptable data link for the exchange of optical data signals, such as the data signals 614 and 615 between the first and second transceivers 601 and 608, a physical link suitable for carrying optical signals must first be established between the transceivers. As shown in FIG. 7A, this link is established between the TOSA 602 of the first transceiver 601 and the ROSA 618 of the second transceiver 608 via the optical fiber 610.

The optical fiber physical link between the TOSA 602 and ROSA 618 is achieved via the use of optical ports (not shown) defined in the housing of each transceiver 601 and 608 such that the optical fiber 610, having connectorized ends, can mate therewith. Note again that the optical fiber 610 can be a single or multiple fibers that in series together define the link between the transceivers 601, 608. Further, intervening components, such as repeaters, amplifiers, or routers, may be interposed along the link. Though not shown in FIGS. 7A-7E, a similar link is established between the ROSA 640 and TOSA 646 of the first and second transceivers 601 and 608, respectively, via the optical fiber 611 (see FIG. 6).

Figure 7B:
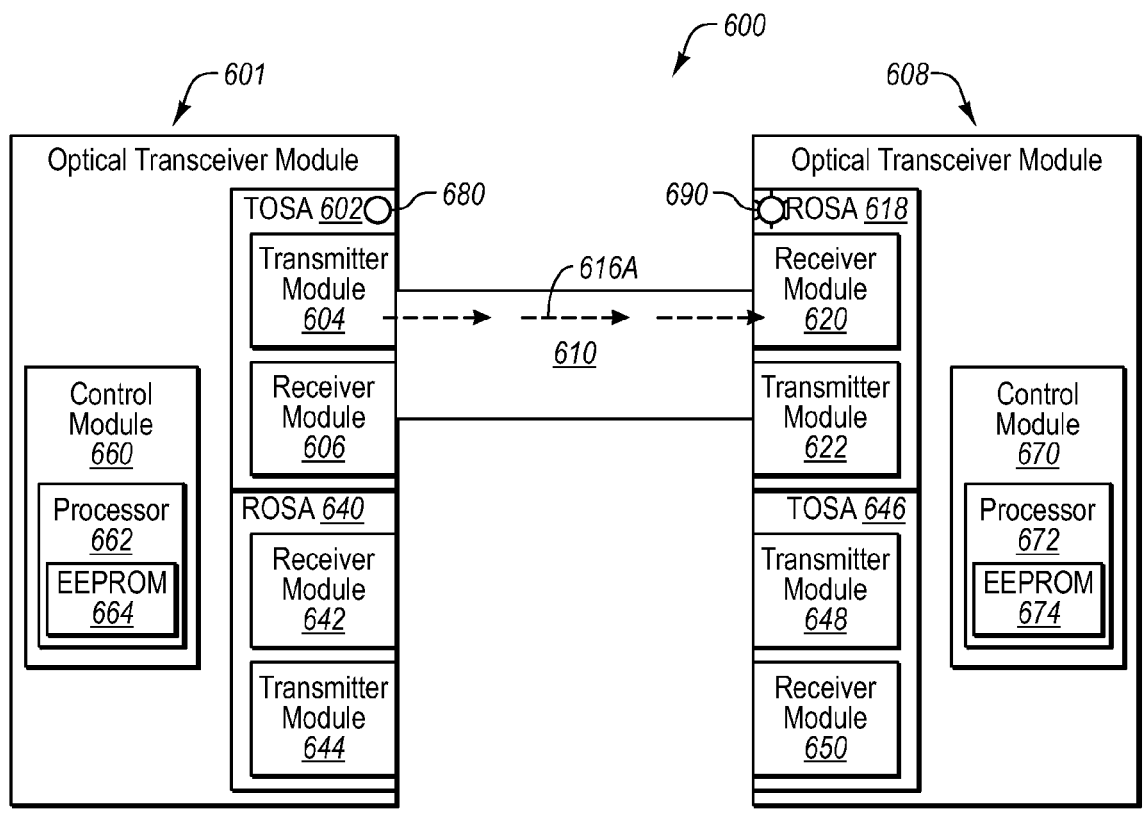

Once both transceivers 601 and 608 are physically linked together via the optical fiber 610, the validation signal 616A is produced by the transmitter module 604 of the first transceiver TOSA 602 and forwarded via the optical fiber 610 to the receiver module 620 of the second transceiver ROSA 618, as shown in FIG. 7B, which receives and detects the validation signal.

Once the validation signal 616A is detected by the second transceiver receiver module 620, the second transceiver 608 can ensure that a threshold for validation of the potential data link between the first and second transceivers has been met. In one embodiment, the link validation threshold is met simply by the successful reception by the second transceiver 608 of the validation signal 616A, as shown here. In another embodiment, the link validation threshold is met by reception by the second transceiver 608 of a validation signal 616A having a sufficient optical power. In other embodiments to be described further below, however, link validation threshold is more involved.

With the validation signal 616A having been received and detected by the second transceiver module 608, a link indicator is asserted, or activated in the second transceiver. In the present embodiment the link indicator is implemented as an indicator light 690 externally disposed on the outer surface of the second transceiver 608 such that it is visible to a user or technician when lit. However, in other embodiments the link indicator can be configured in other formats, either different than or in addition to the indicator light 690. For instance, an alert signal sent to the host device in which the second transceiver 608 is disposed can be part of the link indicator asserted by the second transceiver. Or, assertion of the link indicator can include the storing of validation information in a memory location of the EEPROM memory 674 of the processor 672, or toggling a hardware pin of the control module between a high/low setting. In the present case, however, the indicator light 690, as the link indicator, is lit upon the link validation threshold having been met at the second transceiver 608.

Figure 7C:
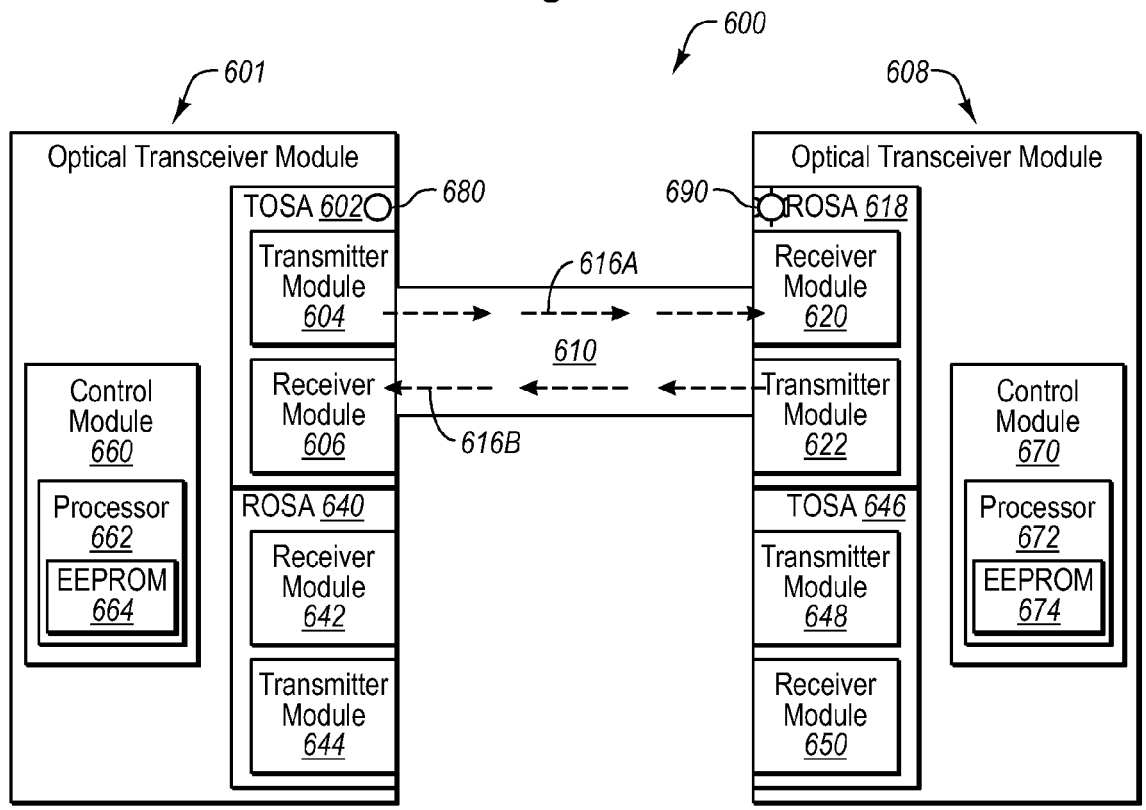

As shown in FIG. 7C, the transmitter module 622 of the second transceiver ROSA 618 now produces and forwards a return validation signal 616B to the receiver module 606 of the first transceiver TOSA 602. Upon receipt and detection of the return validation signal 616B, the first transceiver can verify that a threshold for validation of a potential data link between the first and second transceivers has been met. As has already been discussed, in the present embodiment this link validation threshold is met simply by the successful reception by the first transceiver 601 of the return validation signal 616B, as shown here.

Figure 7D:
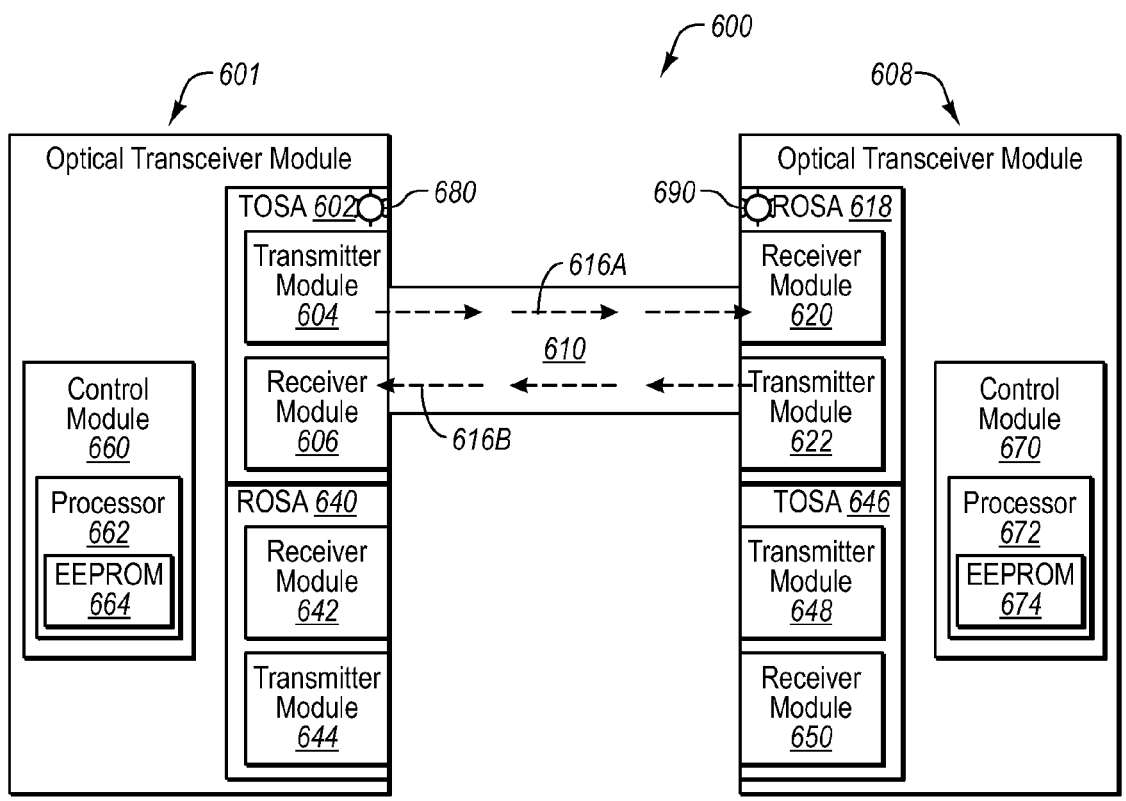

Once it has been determined that the link validation threshold has been met, the first transceiver 601 asserts its link indicator, in this case, the indicator light 680, which is lit so that a user or technician can visually confirm that a valid data link has been established between the first and second transceivers 601, 608. This status is shown in FIG. 7D, where both indicator lights 680 and 690 of the first and second transceivers 601, 608 are lit, indicating that the data link has been fully validated and is ready for optical data exchange between the transceivers.

Note that in the present embodiment the validation signals 616A and 616B are continuously transmitted while the first and second transceivers 601, 608 are operable, i.e., receiving a power supply and switched on. In another embodiment, it is possible to have the validation signals periodically sent at some predetermined interval or when needed to ensure the data link is still functional.

Figure 7E:
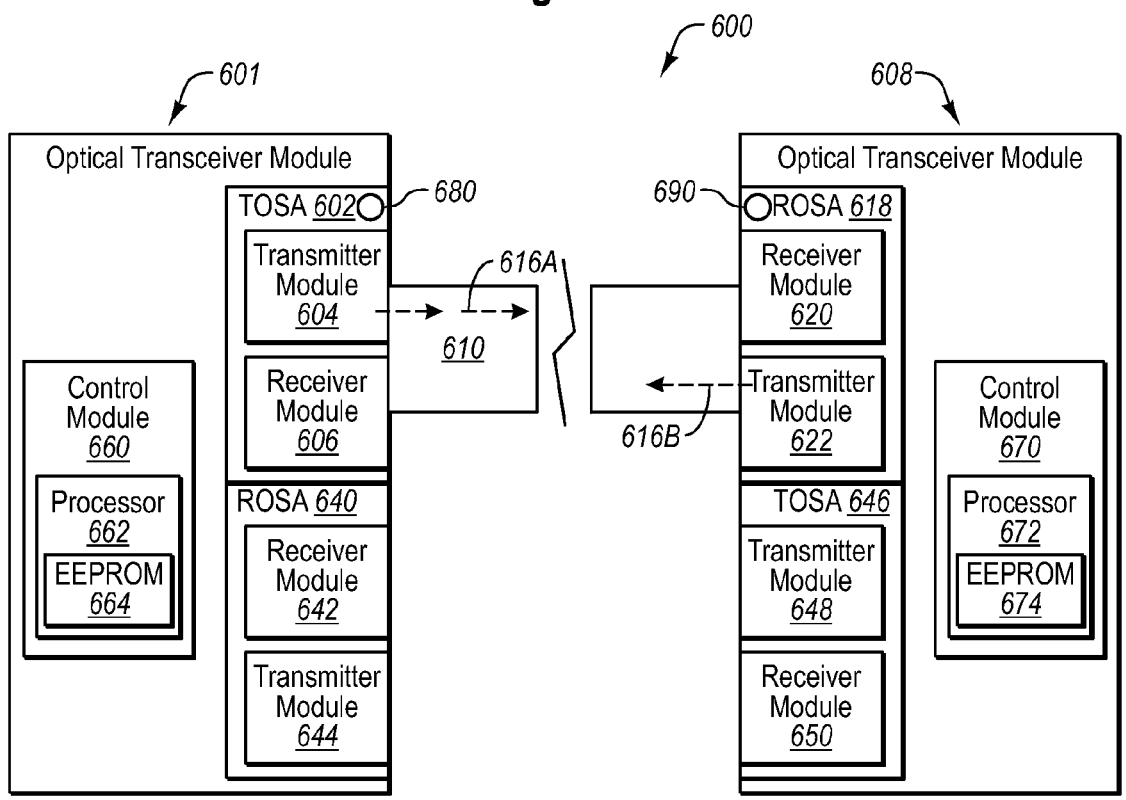

In the case where the validation signals 616A and 616B are continuously sent between the first and second transceiver 601 and 608, it is possible to ascertain when the data link between the transceivers has been interrupted through an unforeseen event, such as breakage or damage to the optical fiber 610, or disconnection of the optical fiber from one of the transceiver ports. FIG. 7E figuratively shows such a scenario where the data link is interrupted by a break in the optical fiber 610. If such an event occurs, the validation signals 616A and 616B are also interrupted, which causes each transceiver 601, 608 to de-assert the link indicator, in this case the respective indicator lights 680 and 690, which will each turn off. This de-assertion of the link indicator will therefore be easily observable by the user or technician, enabling them to more easily debug the link.

More generally, the indicator lights 680 and 690 simplify debugging of the link. For instance, if both indicator lights 680 and 690 are lit, it can be assumed the link in both directions is valid. If both lights are unlit, a problem with one or both transceivers or the optical fiber can be assumed.

As noted before, the link validation described above is controlled in one embodiment by the control modules 660 and 670, respectively, and their corresponding processors. As mentioned, in another embodiment, the control modules can control the link validation in an analog manner.

Note that in the above case where the link indicators are asserted by the transceivers 601 and 608 simply by the reception of a validation signal from the other transceiver, the validation signal 616A can actually be part of the data signal 614 that is transferring data between the two transceivers. As such, the validation signal and data signal are one in the same. The return validation signal 616B remains as an independent signal. The same relationship can be had for validation between the TOSA 646 and ROSA 640.

As described above, upon receiving one of the validation signals 616A or 616B, the first and second transceiver 601, 608 can verify that a threshold for validation of a potential data link between the two transceivers has been met. In the above embodiment, this threshold was met by one transceiver simply receiving and detecting the validation signal from the other transceiver. In another embodiment, however, the threshold can involve an authentication of one transceiver by the other transceiver. In this embodiment, the validation signal 616A sent by the first transceiver 601 to the second transceiver 608 can be an encrypted optical signal or an optical signal scrambled in a predetermined manner.

Once it receives the encrypted or scrambled validation signal, the second transceiver 608 must decipher or unscramble the validation signal, then send the return validation signal 616B showing evidence or the contents of the decrypted or unscrambled validation signal 616A. Upon returning the deciphered or unscrambled validation signal 616B, the second transceiver 608 is considered to have verified that the threshold for validation of the potential link between the transceivers has been met on its end and asserts its link indicator, i.e., lights the indicator light 690.

Upon receiving and ensuring the decryption or unscrambling performed by the second transceiver on the validation signal 616A as evidenced by the return validation signal 616B, the first transceiver is considered to have verified that the threshold for validation of the link has been met on its end. The first transceiver then asserts its link indicator and lights its indicator light 680. The data link, now established, can proceed with data transfer between the transceivers 601, 608.

Should the second transceiver not properly handle the encrypted or scrambled validation signal 616A, e.g., perform an incomplete or improper decryption or unscrambling, or not send any return signal at all, the first transceiver will not assert its link indicator and data transfer between the transceivers will be prevented. Thus, this embodiment serves as a technique for authenticating transceivers in the data link to ensure that only authorized transceivers are employed in the data link.

Alternatively, the second transceiver 608 can send an encrypted or scrambled validation signal 616B to the first transceiver 601 in manner similar to the transmission of the encrypted or scrambled validation signal 616A by the first transceiver, as described above. The encrypted or scrambled validation signal 616B can be sent by the second transceiver 608 in response to either an unencrypted/unscrambled or encrypted/scrambled validation signal 616A from the first transceiver 601. In either case, successful decryption or unscrambling by the first transceiver 601 will enable the first transceiver to assert its link indicator, while unsuccessful decryption or unscrambling will not. Note that the validation signals spoken of above can be modulated or un-modulated, as the case may require.

In order for them to be able to decrypt or unscramble the validation signals, the transceivers in one embodiment are pre-loaded with the necessary algorithms, decryption codes, "magic keys," or unscrambling recipes. Such data can be stored in persistent memory of the transceiver and employed by its processor in decrypting, deciphering, unscrambling, etc., the validation signal sent by the other transceiver. In one embodiment, the transceivers are each pre-loaded with the necessary keys, algorithms, or codes at time of manufacture. In yet another embodiment, encryption or scrambling procedures can be dictated by one or both host devices in which the transceivers are housed. Use of encryption or scrambling as described here can result in ensuring compatibility between inter-operating transceivers in a communication system, and can assist in providing a secure data transfer link for use in sensitive or confidential environments, government applications, etc.

In yet another embodiment the validating signals can include identifying or compatibility data of the transceiver that is transmitting the validation signal. Thus in the environment shown in FIG. 1-7D, the validation signal 616A can include information relating to the characteristics or operational aspects of the first transceiver 601, such as maximum data rate, extinction ratio, power level, optical signal wavelength, etc. Alternatively, the validation signal 616A can request such information from the second transceiver 608. In return, the validation signal 616B transmitted by the second transceiver 608 can include details regarding its characteristics or operational aspects. Either transceiver can use these data to determine whether to assert its respective link indicator and enable communication with the other transceiver. For example, the first transceiver 601 can receive the validation signal 616B from the second transceiver 608 and determine that the data rate of the second transceiver is incompatible with that of the first transceiver. As such, the first transceiver 601 does not assert its link indicator and no mutual communication is commenced between the transceivers. Similarly, the second transceiver 608 can refuse to assert its link indicator if it determines it is not compatible with the first transceiver 601.

As they are configured in one embodiment to operate independent of the host devices in which they are disposed, the transceivers perform the above encryption validation process before data transfer is commenced therebetween. Thus, this embodiment differs from that of one embodiment described above in that the validating signals are separate and distinct from any data signals transmitted between the two transceivers.

Figure 8:
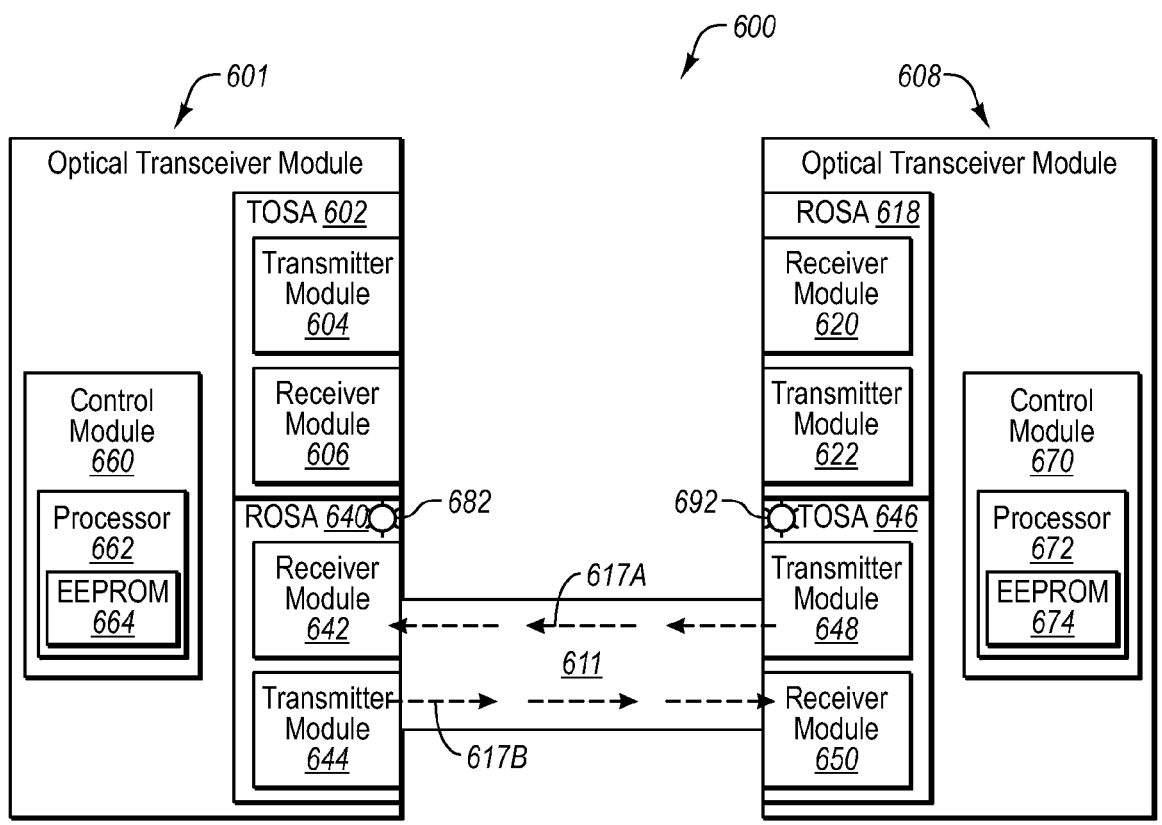
FIG. 8 is a simplified schematic diagram that illustrates a bidirectional communication system including elements of the present invention according to another embodiment.

The particular designation of "first" and "second" transceiver, and the use of the physical link provided by the optical fiber 610 is not critical to the present invention. Indeed, as shown in FIG. 8 one embodiment of the present invention can be practiced wherein link validation can occur between the second transceiver TOSA 646 and the first transceiver ROSA 640 via the optical fiber 611. Also, described above in terms of two transceivers remotely positioned with respect to one another, embodiments of the present invention extend to configurations where link validation occurs between more than two transceivers. Examples of this include three or more transceivers that are daisy-chained together in operable communication but that require link validation between adjacent transceivers in the chain in order to enable data transfer to occur.

Figure 9:
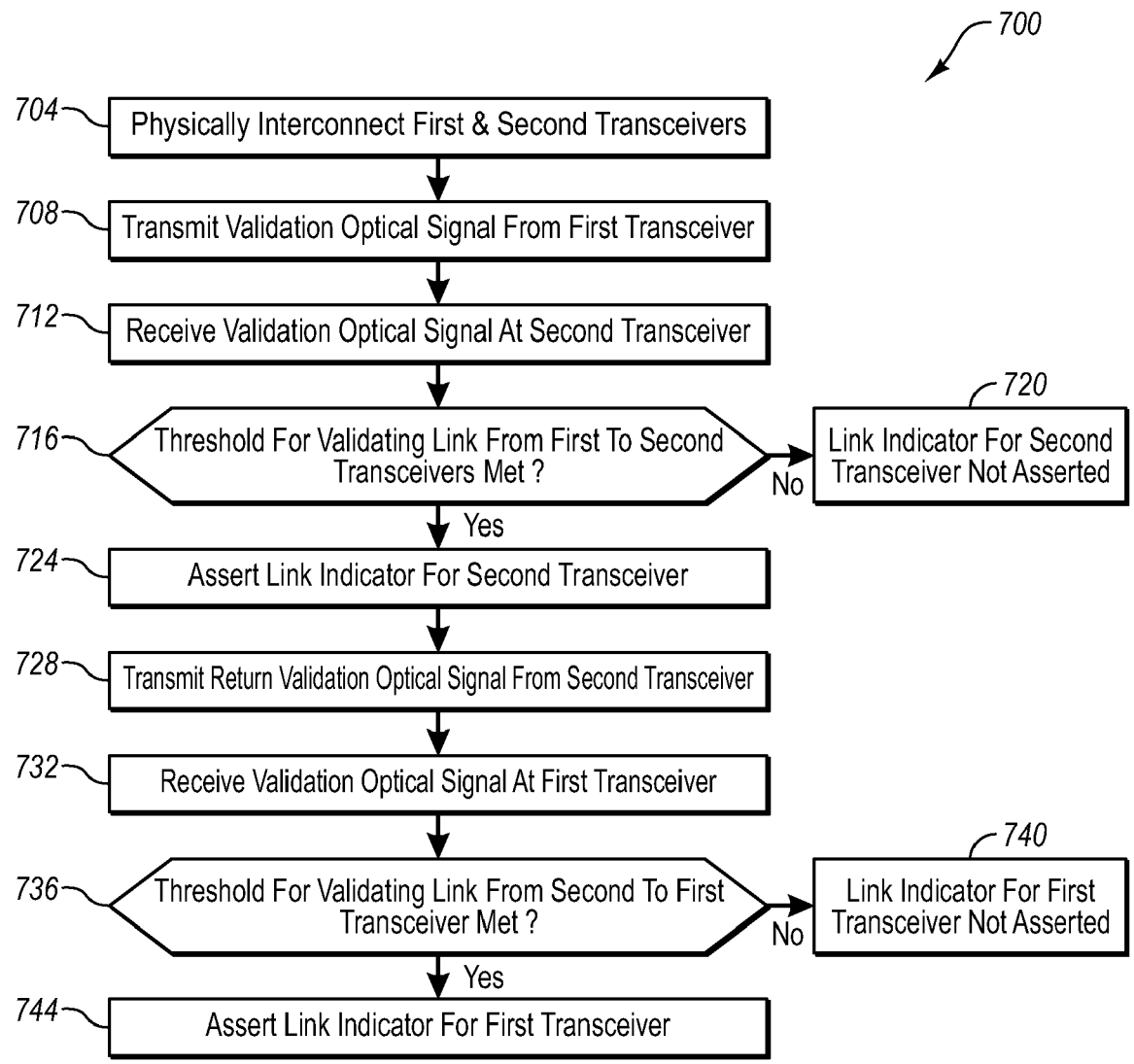
FIG. 9 is a flow diagram that illustrates various stages of a method performed in accordance with one embodiment of the present invention.

Reference is now made to FIG. 9, which depicts various stages of a method, generally depicted at 700, for validating a data link between first and second transceivers, according to one embodiment. In a first stage 704, the first and second transceivers are physically interconnected via an optical fiber or other suitable optical waveguide, as shown in FIG. 6. In stage 708, a validation optical signal is transmitted from the first transceiver, which is received at the second transceiver in stage 712. Upon receipt of the validation optical signal, the second transceiver determines, at stage 716, whether a threshold for validating a potential data link between the first and second transceivers has been met.

As has already been described, the threshold determination of stage 716 can be as simple as the second transceiver determining whether it has detected the validation signal that was sent by the first transceiver. In other embodiments determining whether the threshold has been met can include acceptably decrypting or unscrambling, by the second transceiver, the encrypted or scrambled validation signal sent by the first transceiver; or comparing or preparing for comparison certain operating characteristics of the second transceiver with those of the first transceiver, as contained in the validation signal, for purposes of compatibility. Details regarding each of these situations for determining whether the threshold for validating the link has been met are discussed above in connection with FIG. 7C.

If, as in stage 720 the threshold for link validation has not been satisfactorily met, the link indicator is not asserted. As discussed, this could result from failure to properly decrypt, unscramble, or even comprehend the validation signal sent from the other transceiver, or from failing to acceptably match the operating characteristics or other predetermined aspects as detailed in the validation signal. As discussed, with its link indicator not asserted, the second transceiver is prevented from engaging in typical data exchange with the first transceiver.

If, however, as in stage 724 the threshold for link validation has been satisfactorily met, the link indicator for the second transceiver is asserted, including in one embodiment the lighting of the second transceiver indicator light. The second transceiver then transmits a return validation optical signal at stage 728, which is received by the first transmitter at stage 732. As was the case with the second transceiver, upon receipt of the return validation signal the first transceiver determines, at stage 736, whether a threshold for validating a potential data link between the first and second transceivers has been met. Again, this can be determined for instance by simply detecting the return validation signal, by ensuring any decryption, unscrambling or similar process has been acceptably performed by the second transceiver as evidenced by the content of the return validation signal, or by analyzing the compatibility information contained in the return validation signal in order to determine whether the first transceiver can compatibly operate with the second transceiver.

If, as in stage 740 the threshold for link validation has not been satisfactorily met, the link indicator for the first transceiver is not asserted and the first transceiver is prevented from engaging in typical data exchange with the second transceiver. If, however, as in stage 744 the threshold for link validation has been satisfactorily met, the link indicator for the second transceiver is asserted, including lighting of the first transceiver indicator light. The data link between the first and second transceivers is now validated and both transceivers can now commence data transfer therebetween. In this sense, the first transceiver conditionally enables data transfer to occur between the transceivers, depending on the meeting of one or both of the thresholds described above.

Embodiments of the present invention provide various features and advantages not previously possible. Because the link validation performed by the transceivers is host independent, the link validation performed by transceivers configured as described above can be performed regardless of the particular host devices housing the transceivers. Use of this link validation system can also prevent the use of non-authorized transceivers in a data link by ensuring that each transceiver used can authenticate its identity prior to being allowed participation in the link.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical communication system capable of data link validation, the system comprising:
   first and second optical transceiver modules each including a transmitter optical subassembly and a receiver optical subassembly and being operably connected to one another, wherein:
      the transmitter optical subassembly of the first optical transceiver module is configured for bidirectional optical communication with the receiver optical subassembly of the second optical transceiver module, the transmitter optical subassembly of the first optical transceiver being configured to transmit a first validation optical signal to the receiver optical subassembly of the second optical transceiver module, wherein the receiver optical subassembly of the second optical transceiver is configured to return a second validation optical signal to the transmitter optical subassembly of the first optical transceiver module after receiving the first validation optical signal so as to permit at least one link indicator to be asserted with at least one of the first and second optical transceiver modules, wherein the transmitter optical subassembly of the first optical transceiver module is configured to transmit data to the receiver optical subassembly of the second optical transceiver and the transmitter optical subassembly of the second optical transceiver module is configured to transmit data to the receiver optical subassembly of the first optical transceiver module.

2. The optical communication system as defined in claim 1, wherein the first validation optical signal is an encrypted or scrambled optical signal, wherein the second optical transceiver module is configured to decrypt or unscramble the first validation optical signal and wherein the second validation optical signal relates to the decryption or unscrambling performed by the second optical transceiver module.

3. The optical communication system as defined in claim 1, wherein at least one of the first and second validation optical signals includes information regarding predetermined characteristics of at least one of the first and second optical transceiver modules.

4. The optical communication system as defined in claim 3, wherein at least one of the predetermined characteristics is selected from the group consisting of maximum data rate, extinction ratio, power level, and optical signal wavelength.

5. The optical communication system as defined in claim 1, wherein the first and second optical transceiver modules each include a control module having a processor capable of executing microcode, and wherein the microcode when executed causes the respective optical transceiver module to transmit one of the first and second validation optical signals.

6. The optical communication system as defined in claim 1, wherein the first and second optical transceiver modules are physically interconnected via an optical fiber.

7. The optical communication system as defined in claim 1, wherein at least one of the first and second validation optical signals is a continuous optical signal.

8. In an optical communication system including a first optical transceiver module having a transmitter optical subassembly configured for bidirectional communication with a receiver optical subassembly of a second optical transceiver module, a method for validating a data link between the first and second optical transceiver modules, the method comprising:
- by the receiver optical subassembly of the second optical transceiver module, receiving a first validation optical signal from the transmitter optical subassembly of the first optical transceiver module;
- determining whether a predetermined threshold for validating the data link at the second optical transceiver modules has been met;
- if the predetermined threshold is met, transmitting a second validation optical signal from the receiver optical subassembly to the transmitter optical subassembly to enable data transfer between the first and second optical transceiver modules;
- after validation:
  - transmitting data from the transmitter optical subassembly of the first optical transceiver module to the receiver optical subassembly of the second optical transceiver; and
  - transmitting data from a transmitter optical subassembly of the second optical transceiver module to a receiver optical subassembly of the first optical transceiver.

9. The method for validating as defined in claim 8, further comprising making data available to a host device regarding validation of the data link between the first and second optical transceiver modules.

10. The method for validating as defined in claim 9, wherein making data available to the host device further includes making data available to the host device via a hardware pin included on a control module of the first or second optical transceiver module.

11. The method for validating as defined in claim 8, further comprising: by the transmitter optical subassembly of the first optical transceiver module, receiving the second validation optical signal from the receiver optical subassembly of the second transceiver module; and determining whether a predetermined threshold for validating the data link at the first optical transceiver module has been met.

12. The method for validating as defined in claim 11, further comprising: if the predetermined threshold is met at the second optical transceiver module, asserting a link indicator of the second optical transceiver module; and if the predetermined threshold is met at the first optical transceiver module, asserting a link indicator of the first optical transceiver module.

13. The method for validating as defined in claim 12, wherein the link indicators are indicator lights disposed on the first and second optical transceiver modules.

* * * * *